(12) United States Patent
Sasaki

(10) Patent No.: US 6,411,658 B1
(45) Date of Patent: Jun. 25, 2002

(54) DEMODULATION DEVICE

(75) Inventor: Eisaku Sasaki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/359,239

(22) Filed: Jul. 22, 1999

(30) Foreign Application Priority Data

Jul. 22, 1998 (JP) ............................................ 10-206456

(51) Int. Cl.[7] .......................................... H04L 27/227
(52) U.S. Cl. ................... 375/326; 375/325; 375/327; 375/373; 375/376; 329/307; 329/346
(58) Field of Search ..................... 375/322, 324–327, 375/340, 371, 373, 376; 329/304, 307, 306, 308, 323, 325, 345, 346

(56) References Cited

U.S. PATENT DOCUMENTS 4,458,356 A * 7/1984 Toy .............................. 375/261
4,871,973 A * 10/1989 Yoshihara ................... 329/308

FOREIGN PATENT DOCUMENTS

| JP | 63-114480 | 5/1988 |
| JP | 7-177194 | 7/1995 |
| JP | 9-200044 | 7/1997 |

* cited by examiner

*Primary Examiner*—Chi Pham
*Assistant Examiner*—Khanh Cong Tran
(74) *Attorney, Agent, or Firm*—Dickstein Shapiro, Morin & Oshinsky, LLP (57) ABSTRACT

A demodulation device having a demodulating circuit that conducts the primary demodulation of received modulation wave, and a carrier recovery circuit that regenerates a carrier from demodulation signal by the demodulating circuit and conducts the secondary demodulation of baseband signal using the carrier. The carrier recovery circuit has: a complex operation part that conducts the phase correction of the primary demodulation signal by the demodulating circuit; a phase error detecting circuit that detects the phase difference of output signal of the complex operation part; a loop filter that suppresses noise component of output signal of the phase error detection circuit; a sweeper that generates a predetermined sweep waveform according to carrier synchronous information; a processing circuit that conducts a processing to bring a value of the loop filter near to its center value after the carrier synchronization is established; an adding circuit that calculates a value of automatic phase control (APC) by adding three signals of output signal of the loop filter, output signal of the sweeper and output signal of the processing circuit; and a controlled oscillator that outputs a signal to bring the error component of phase and frequency output from the complex operation part phase near to zero to the complex operation part according to output signal of the adding circuit.

3 Claims, 8 Drawing Sheets

DEMODULATION DEVICE

FIELD OF THE INVENTION

This invention relates to a demodulation device, and more particularly to, a demodulation device of quasi-coherent detection system equipped with a carrier recovery circuit.

BACKGROUND OF THE INVENTION

In demodulation devices used in communication equipment for satellite communications etc., in order to make the device free from adjustment to reduce the maintenance cost and to stabilize the characteristic, the digitization of device starts coming into practical use. As the system of digitizing the carrier recovery circuit of a demodulation device, there is the quasi-coherent detection system. The quasi-coherent detection is conducted by that the local oscillation signal of LO (local oscillator) which has a frequency near to the carrier frequency but asynchronous and IF (intermediate frequency) signal to be input are multiplied to give BB (base band) signal, further converted into digital signal, where a frequency difference remained a little is compensated by using the carrier recovery circuit formed as a digital circuit. By such a composition, the composition of LO can be changed from VCO (voltage controlled oscillator) to a composition (quasi-coherent detection system) with fixed oscillation frequency by quartz oscillator. Therefore, the adjustment of analogue circuit becomes unnecessary and the variation of characteristic can be prevented.

For the carrier recovery circuit, pull-in range that can compensate the frequency difference of transmission/reception LO of IF and RF (radio frequency) is required. In case of analogue carrier recovery circuit, with a loop bandwidth of carrier recovery PLL (phase-locked loop) in stationary state, the range of pulling into synchronization for carrier cannot be sufficiently secured. Therefore, an oscillator called a sweeper is provided.

Figure 1:
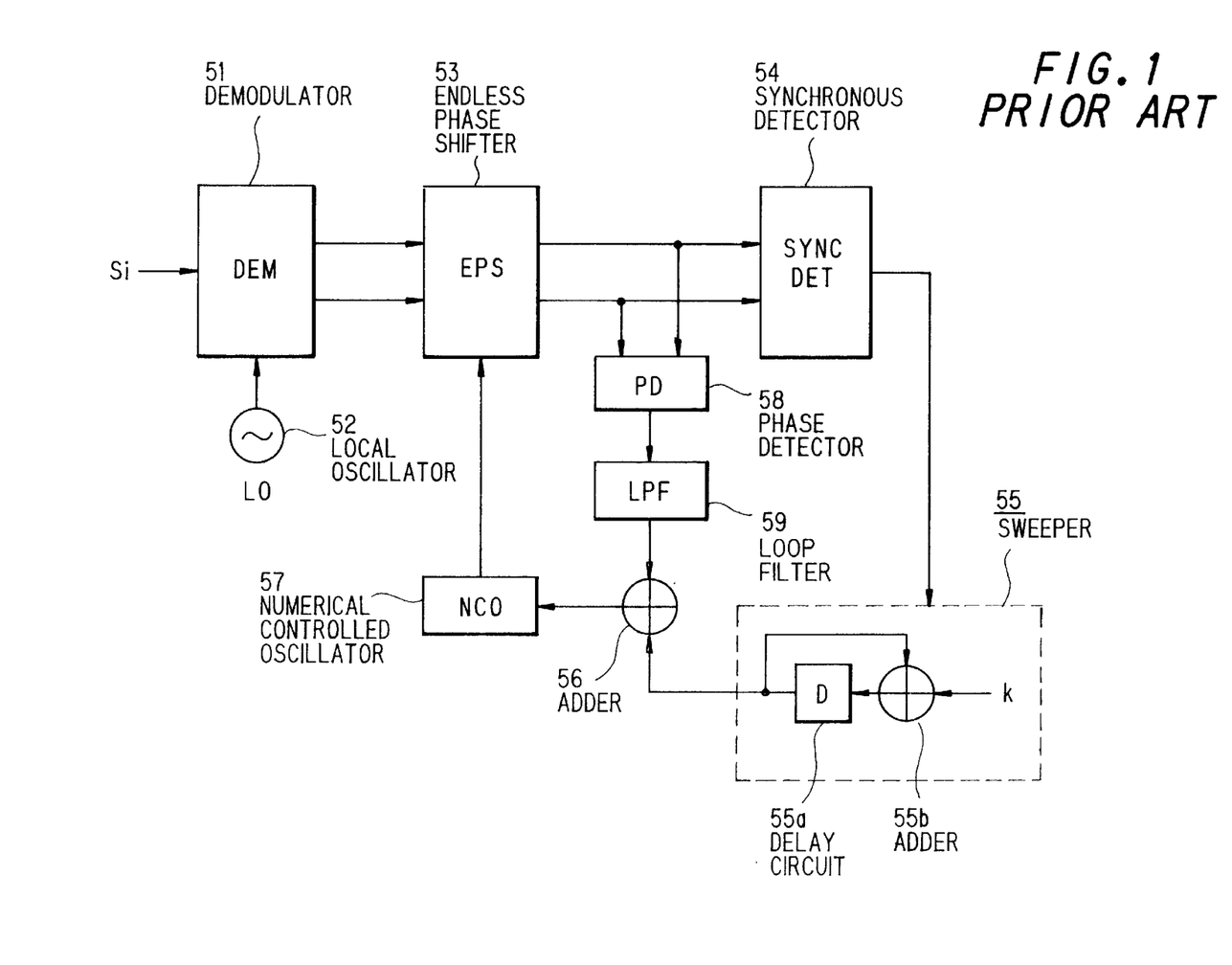
FIG. 1 is a block diagram showing the conventional digitized quasi-coherent detection demodulation device.

FIG. 1 shows a conventional digitized demodulation device of quasi coherent detection system, which is disclosed in Japanese patent application laid-open No. 7-177194 (1995). The demodulation device comprises a demodulator (DEM) 51, a local oscillator (LO) 52, an endless phase shifter (EPS) 53 as a complex multiplier, a synchronous detector (SYNCDET) 54, a sweeper 55, an adder 56, a numerical controlled oscillator (NCO) 57, a phase detector (PD) 58 and a loop filter (LPF) 59.

The sweeper 55 comprises a delay circuit 55a and an adder 55b. Data k and one-bit output of the delay circuit 55a are added by the adder 55b. The delay output of the added value becomes sweep data, which will be control data of NCO 57 through the adder 56.

In the composition of device in FIG. 1, input signal Si is demodulated by DEM 51 and a local oscillator 52, where the demodulated signal is signal that is phase-rotated according to the difference between the carrier frequency of received modulated signal and the oscillation frequency of the local oscillator 52. So, a given correction is made by EPS 53. In PD 58, the phase error of demodulated signal is detected, and further high region is cut by LPF 59. The output signal of LPF 59 is applied through the adder 56 to NCO 57 as a control data. In the synchronous detector 54, the synchronous detection to output of EPS 53 is conducted and the result is applied to the sweeper 55. The sweeper 55 outputs a waveform (saw-tooth wave) with an amplitude corresponding to a desirable range of pulling into synchronization, and this is added to output of the LPF 59 at the adder 56. By this addition result, the oscillation of NCO 57 is controlled so that the oscillation range of NCO 57 is enlarged. By the output frequency of NCO 57, the amount of phase shift at EPS 53 is controlled.

In the carrier pull-in process (in pulling out of synchronization), at first, the sweeper 55 operates so that the oscillation frequency of NCO 57 comes near to the oscillation frequency of input signal Si. When the difference between the carrier frequency of input signal Si and the oscillation frequency of NCO 57 falls within the range of pulling into synchronization of LPF 59, the value of LPF 59 varies to establish the synchronization, when the establishment of synchronization is detected, the operation of the sweeper 55 stops and thereby the operation of pulling into synchronization is completed. A variation of carrier frequency occurred thereafter is followed by using output of LPF 59 to keep the synchronization with carrier.

In recent years, for the purpose of reducing the cost and making the frequency variable, LO of RF section employs a synthesizer system increasingly. In this system, since the phase noise of LO is large, it is necessary to enhance the durability against phase noise, i.e., it is necessary to keep such a condition that pulling out of carrier synchronization is hard to cause by cluttering from outside. The most durable against cluttering from outside is a state that LPF operates around the center value (=0).

Figure 2:
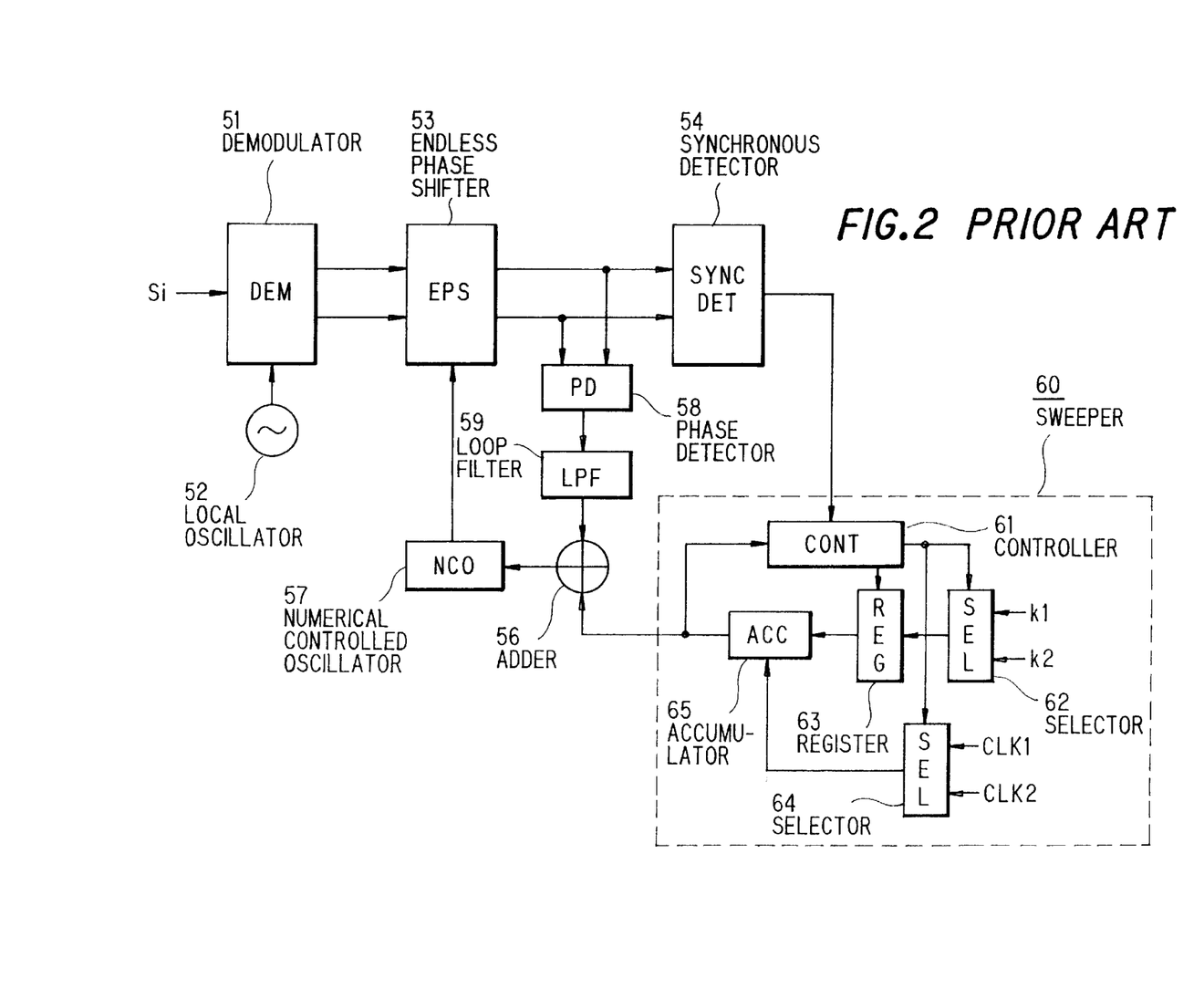
FIG. 2 is a block diagram showing the other conventional demodulation device as a modification of the device in FIG. 1.

FIG. 2 shows a conventional demodulation device of quasi-coherent detection system composed as a modification of the device in FIG. 1. This demodulation device is disclosed in Japanese patent application laid open No. 7-177194 (1995) (ibid. FIG. 1), and the difference from the device in FIG. 1 is a sweeper 60. The sweeper 60 comprises a controller (CONT) 61 as a detection control block, a selector 62 to select either of set values k1 and k2, a register (REG) 63, a selector 64 to select either of clocks CLK1 and CLK2, and an accumulator 65 to conduct a given operation based on outputs of the register (REG) 63 and the selector (SEL) 64. The other components are the same as those in FIG. 1, therefore its explanation is omitted herein.

In SEL 62 either of the set value k1 for addition and the set value k2 for subtraction can be selected, and is SEL 64 either of CLK1 with high speed and CLK2 with low speed can be selected. The sweeper 60 is actuated when the synchronous detector 54 detects the pulling into synchronization or pulling out of synchronization.

When the pulling out of synchronization is detected, CONT 61 starts controlling so that the set value k1 for addition is selected by SEL 62 and CLK1 with high speed is selected by SEL 64. According to CLK1, ACC 65 conducts the accumulation, and output of ACC 65 is applied through the adder 56 to NCO 57 as control data. Also, when the pulling into synchronization is detected by the synchronous detector 54. ACC 65 stops accumulating and the output value is held. Hereupon, SEL 62 is switched into the set value k2 for subtraction and SEL 64 is switched into CLK2 with low speed.

In the pulling out of synchronization, based on pull out detection signal from the synchronous detector 54, SEL 62 selects the set value k1 for addition and SEL 64 selects CLK1 with high speed. Thereby, REG 63 is set to the set value k1 for addition, and ACC 65 accumulates the set value k1 for addition based on CLK1, this accumulation result is applied through the adder 56 to NCO 57 as control data. Also, when pull-in detection signal from the synchronous detector 54 is input, REG 63 is cleared by CONT 61 and the sweep data is held. Then, CONT 61 controls SEL 62 to select the set value k2 for subtraction and controls SEL 64 to select CLK2 with low speed. According to CLK2 with low speed, ACC 65 accumulates the set value k2 for subtraction set at REG 63. Hereupon, the sweep data reduces gradually so that PLL can follow sufficiently, when coming to zero or near to zero, CONT 61 clears REG 63.

In the pulling into synchronization, based on pull in detection signal from the synchronous detector 54, CONT 61 clears REG 63. Thereby, input of ACC 65 becomes zero, the sweep data at that time is held. Then, as described above, REG 63 is set to the set value k2 for subtraction and the sweep data reduces gradually. When CONT 61 detects the sweep data comes to zero or near to zero in the period that pull-in detection signal is applied, it clears REG 63. Hereupon, although the sweep data is kept at zero, this is in the same state that the sweeper 60 is separated from PLL.

However, in the conventional demodulation device, since the carrier frequency of input signal can be included into output of LPF, LPF may operate deviated from the center value. Therefore, when such a deviation frequency from the center frequency is large, the durability against the cluttering of frequency in the positive or negative to the pull-in frequency reduces. As a result, there is a problem that the operation becomes unstable.

SUMMARY OF THE INVENTION

Accordingly, it is an object of the invention to provide a demodulation device that the durability against the cluttering of frequency is enhanced regardless of the frequency difference between the carrier frequency of input signal and the frequency of internal local oscillator, and a constant synchronous characteristic can be obtained.

According to the invention, a demodulation device, comprises:
- a demodulating means that conducts the primary demodulation of received modulation wave; and
- a carrier recovery circuit that regenerates a carrier from demodulation signal by the demodulating means and conducts the secondary demodulation of baseband signal using the carrier;

wherein the carrier recovery circuit comprises:
- a complex operation part that conducts the phase correction of the primary demodulation signal by the demodulating means;
- a phase error detection circuit that detects the phase difference of output signal of the complex operation part;
- a loop filter that suppresses noise component of output signal of the phase error detection circuit;
- a sweeper that generates a predetermined sweep waveform according to carrier synchronous information;
- a processing circuit that conducts a processing to bring a value of the loop filter near to its center value after the carrier synchronization is established;
- an adding means that calculates a value of automatic phase control (APC) by adding three signals of output signal of the loop filter, output signal of the sweeper and output signal of the processing circuit; and
- a controlled oscillator that outputs a signal to bring the error component of phase and frequency output from the complex operation part phase near to zero to the complex operation part according to output signal of the adding means.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiment of the invention will be explained below referring to the drawings.

Figure 3:
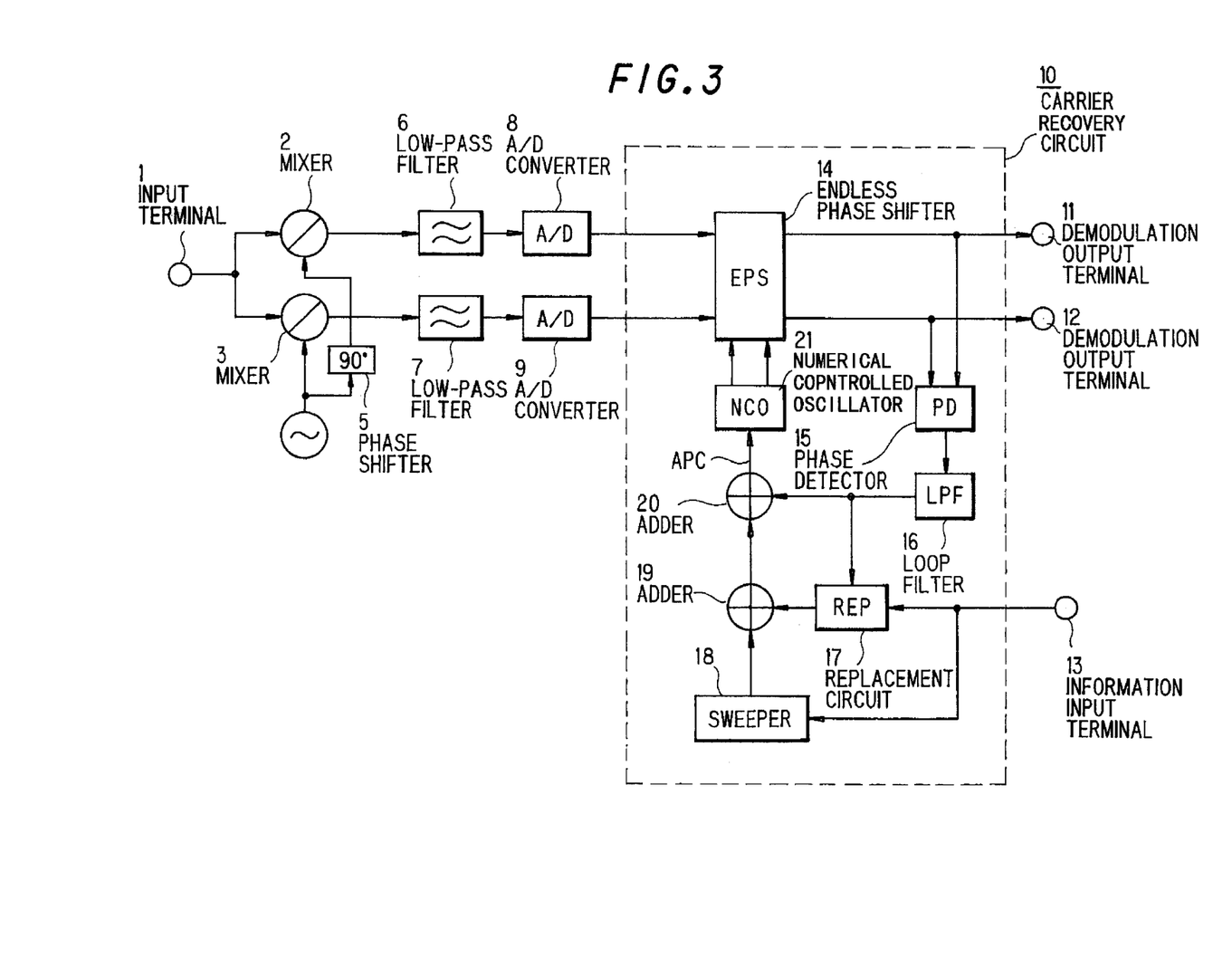
FIG. 3 is a block diagram showing the composition of a demodulation device in a preferred embodiment according to the invention.

FIG. 3 shows the composition of a demodulation device in the preferred embodiment of the invention. An input terminal 1 is connected to mixers 2, 3, the mixer 3 is connected to a local oscillator (LO) 4, and between the mixer 2 and the local oscillator 4, a 90° phase shifter 5 is connected. The outputs of the mixers 2 and 3 are connected to LPF 6 and LPF 7, respectively, and LPF 6 and LPF 7 are connected to analogue/digital (A/D) converters 8 and 9, respectively. The A/D converters 8, 9 are connected to a carrier recovery circuit 10. The carrier recovery circuit 10 comprises demodulation output terminals 11, 12 and an information input terminal 13.

The carrier recovery circuit 10 comprises an endless phase shifter (EPS) 14 connected to the A/D converters 8, 9, a phase difference detector (PD) 15 connected to the demodulation output terminals 11, 12, LPF 16 connected to the output of the phase difference detector 15, a replacement circuit 17, as a processing circuit, connected to LPF 16 and the information input terminal 13, a sweeper 18 connected to the information input terminal 13, an adder 19 connected to the outputs of both the replacement circuit 17 and the sweeper 18, an adder 20 connected to the outputs of both the adder 19 and LPF 16, and a numerical control oscillator 21 connected to the output of the adder 20.

Meanwhile, in general, the carrier recovery circuit 10 is composed of ACC (automatic gain controller) to control best the error rate of amplitude at the decision point of signal. A/D converters 30, 31, ADC (automatic drift controller) to control best the error rate of DC component of input signal, a clock synchronous circuit to control the optimum sampling phase at A/D converters 8, 9. However, these components are not shown in FIG. 3.

In the device in FIG. 3, when modulated signal with IF is input to the input terminal 1, this signal is multiplied by sine waves orthogonal to each other with an oscillation frequency, which is not synchronized with the carrier frequency of demodulated wave, of the local oscillator 4 at the mixers 2 and 3, thereby converted into two channel baseband (BB) signals I, Q, then input to LPF 6, 7. LPF 6, 7 remove unnecessary wave in analogue IF signal (BB signal), then the A/D converters 8, 9 convert it into digital signal, which is input to the carrier recovery circuit 10. The carrier recovery circuit 10 establishes the carrier synchronization, that result is output from the demodulation output terminals 11, 12 as output of the demodulation device.

The endless phase shifter (EPS) 14 of the carrier recovery circuit 10 is a complex multiplier, where output of A/D converters 8, 9 is multiplied by signal components, $\sin^\theta$ and $\cos^\theta$ output from NCO 21, thereby conducting the rotational symmetry conversion of vector. The phase error detection circuit 15 determines whether output of the endless phase shifter 14 is shifted in the direction of phase advance to the location of normal signal point (explained in detail later in FIG. 5), or shifted in the direction of phase delay to that, and outputs this result as phase error information. LPF 16 suppresses the noise component of output signal of the phase error detection circuit 15, outputting a value corresponding to the carrier frequency of input signal to the carrier recovery circuit 10. Here, the output signal of LPF 16 has a same range in the positive and negative around the center value of 0. When the speed of input signal to LPF 16 is fs, the positive maximum value corresponds to [+fs/2] and the negative maximum value corresponds to [−fs/2]. The sweeper 18 outputs triangle wave with same maximum amplitude in the positive and negative around the center value of 0 when being in the asynchronous state according to carrier synchronous information input from the information input terminal 13. After the synchronous information changes from asynchronous to synchronous, it retains an output value at that time.

The replacement circuit (processing circuit) 17 outputs 0 when being in the asynchronous state according to carrier synchronous information input from the information input terminal 13. After the synchronous information changes from asynchronous to synchronous it conducts the accumulation addition of a minimum unit value with a same polarity as the output signal of LPF 16, and further, after the absolute value of output signal of LPF 16 falls within a given range, it retains an output value at that time. The adder 19 adds output of the sweeper 18 to output of the replacement circuit 17. The adder 20 adds output of the adder 19 to output of LPF 16. NCO 21 integrates output of the adder 20, i.e., an APC value corresponding to the carrier of input signal to the carrier recovery circuit 10, thereby converting it into a phase value θ, applying $\sin^\theta$ and $\cos^\theta$ corresponding to this phase value to the endless phase shifter 14.

Figure 4:
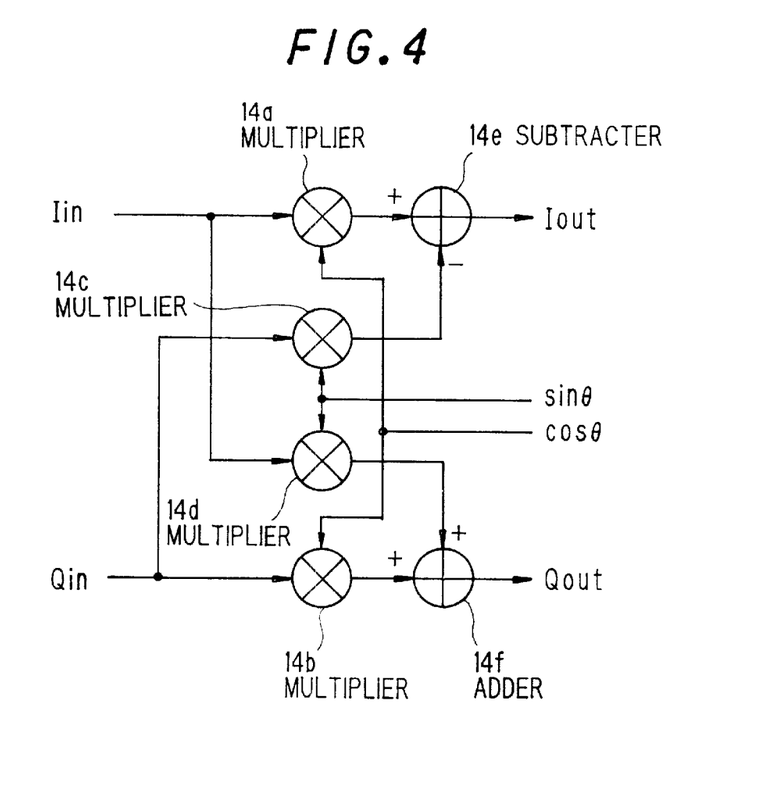
FIG. 4 is a block diagram showing the detailed composition of an endless phase shifter (EPS) in FIG. 3.

FIG. 4 shows the composition of the endless phase shifter 14. The endless phase shifter 14 adapts to the rotational symmetry conversion as represented by:

$$I_{out} = I_{1L} \times \cos^\theta - Q_{1n} \times \sin^\theta \quad (1)$$

$$Q_{out} = I_{in} \times \sin^\theta + Q_{in} \times \cos^\theta \quad (2)$$

Where $I_{in}$ is output value of the A/D converter 8, $Q_{in}$ is output value of the A/D converter 9, $I_{out}$ is output value of the endless phase shifter 14, $Q_{out}$ is output value of the endless phase shifter 14, and $\sin^\theta$ and $\cos^\theta$ are output from NCO 21. Meanwhile, I means 'in phase' and Q means 'quadrature phase'.

The endless phase shifter 14 comprises a multiplier 14a to multiply $\cos^\theta$ from NCO 21 and $I_{in}$, a multiplier 14b to multiply $\cos^\theta$ from NCO 21 and $Q_{in}$, a multiplier 14c to multiply $\sin^\theta$ from NCO 21 and $Q_{in}$, a multiplier 14d to multiply $\sin^\theta$ from NCO 21 and $I_{in}$, a subtractor 14e to subtract output of the multiplier 14c from output of the multiplier 14a to output $I_{out}$ of equation (1), and an adder 14f to add output of the multiplier 14b and output of the multiplier 14d to output $Q_{out}$ of equation (2).

Figure 5:
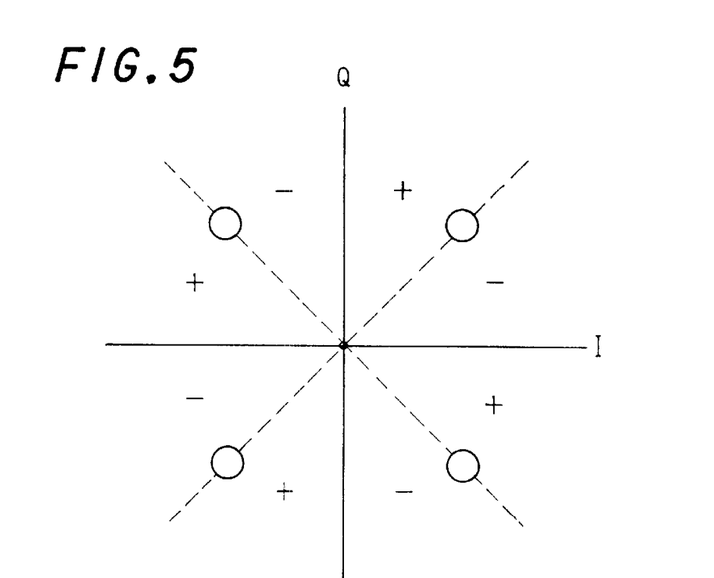
FIG. 5 is an illustration showing the phase judgement region of a phase error detection circuit to QPSK.

FIG. 5 is phase judgement regions by the phase error detection circuit 15 to QPSK (quadrature phase shift keying). Circles (○) in FIG. 5 indicate signal point of QPSK. It outputs detecting which of positive (+) or negative (−) region enclosed by a dotted line running through signal point and origin of coordinates and a solid line orthogonal coordinate axis a reception point is included. The setting of regions in FIG. 5 is no more than an example and another setting may be employed.

Figure 6:
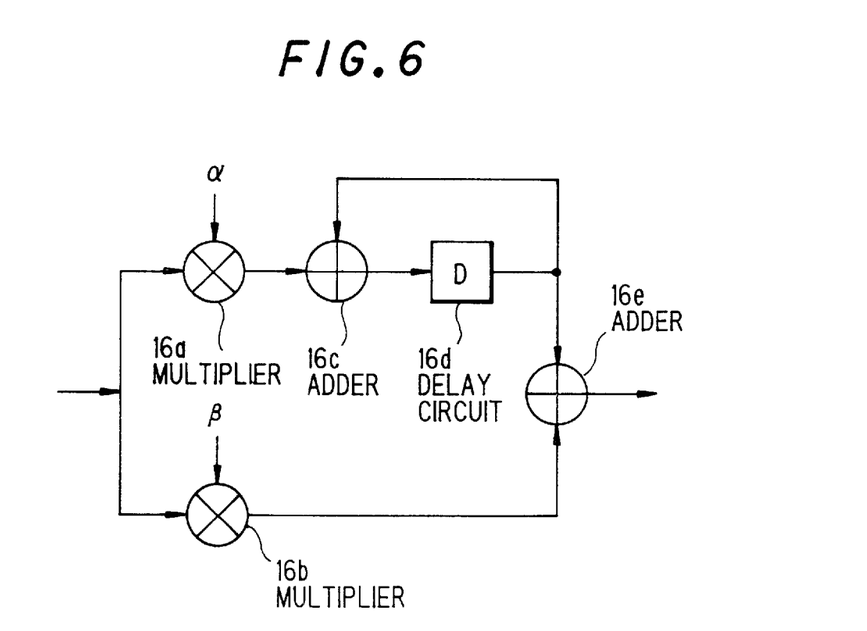
FIG. 6 is a block diagram showing the detailed composition of a loop filter (LPF) 16 in FIG. 3.

FIG. 6 shows the detailed composition of LPF 16. It is a digital filter comprising a multiplier 16a to multiply output signal of the phase error detection circuit 15 and constant α, a multiplier 16b to multiply output signal of the phase error detection circuit 15 and constant β, an adder 16c that output signal of the multiplier 16a is supplied to its one input, a delay circuit (D) 16d to delay output signal of the adder 16c, and an adder 16e to add output of the delay circuit 16d and output of the multiplier 16b.

Figure 7:
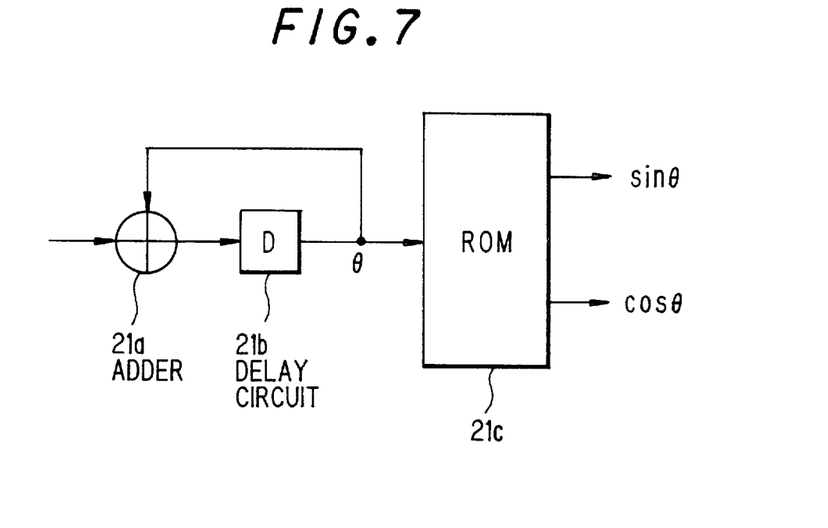
FIG. 7 is a block diagram showing the detailed composition of a numerical controlled oscillator (NCO) in FIG. 3.

FIG. 7 shows the detailed composition of NCO 21. NCO 21 comprises an adder 21a what output signal of the adder 20 is supplied to its input, a delay circuit (D) 21b connected to the adder 21a, and ROM 31c connected to the delay circuit 21b. The adder 21a and the delay circuit 21b compose an accumulator, where input signal corresponding to frequency is converted into a value θ corresponding to phase. The maximum output of the accumulator corresponds to +π and the minimum output corresponds to −π. ROM 21c outputs $\sin^\theta$ and $\cos^\theta$ corresponding to output θ of the delay circuit 21b.

Figure 8:
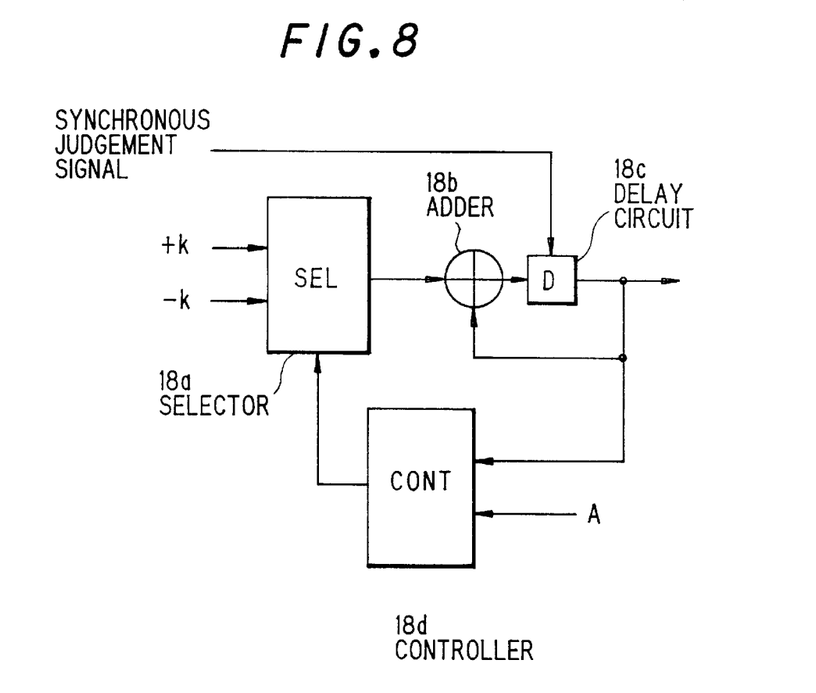
FIG. 8 is a block diagram showing the detailed composition of a sweeper in FIG. 3.

FIG. 8 shows the detailed composition of the sweeper 18. The sweeper 18 comprises a selector (SEL) 18a to select either of set values +k, −k, an adder 18b connected to SEL 18a, a delay circuit (D) 18c to delay output signal of the adder 18b according to synchronous judgement signal, and a controller (CONT) 18d to control SEL 18a according to output of the delay circuit 18c and control signal A. The set value k is a value by integral multiplication of least significant bit (LSB) in digital representation and its true value is obtained normalizing by a maximum value in integer representation.

In the sweeper 18 in FIG. 8, according to synchronous information (synchronous judgement signal), an accumulator composed of the adder 18b and the delay circuit 18c comes into operation state when being in the asynchronous state. SEL 18a selects the set value +k or −k, and this value is input to the accumulator.

Figure 9:
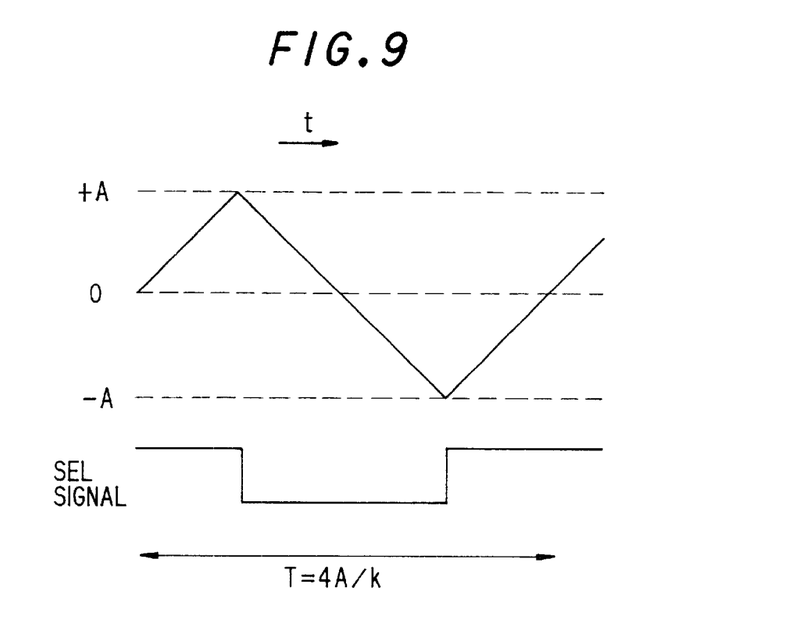
FIG. 9 is a waveform diagram showing the operation of components in FIG. 8.

FIG. 9 shows operational waveforms of SEL 18a and CONT 18d of the sweeper 18 in FIG. 8. Drive signal to switch SEL 18a is output from CONT 18d. CONT 18d compares sweeper output (output of the delay circuit 18c) with upper and lower threshold values (+A, −A). Every time when the sweeper output reaches the threshold values (⊥A), the polarity of drive signal applied to SEL 18a is reversed. After synchronous judgement signal is input to the delay circuit 18c, output of the delay circuit 18c is retained.

Figure 10:
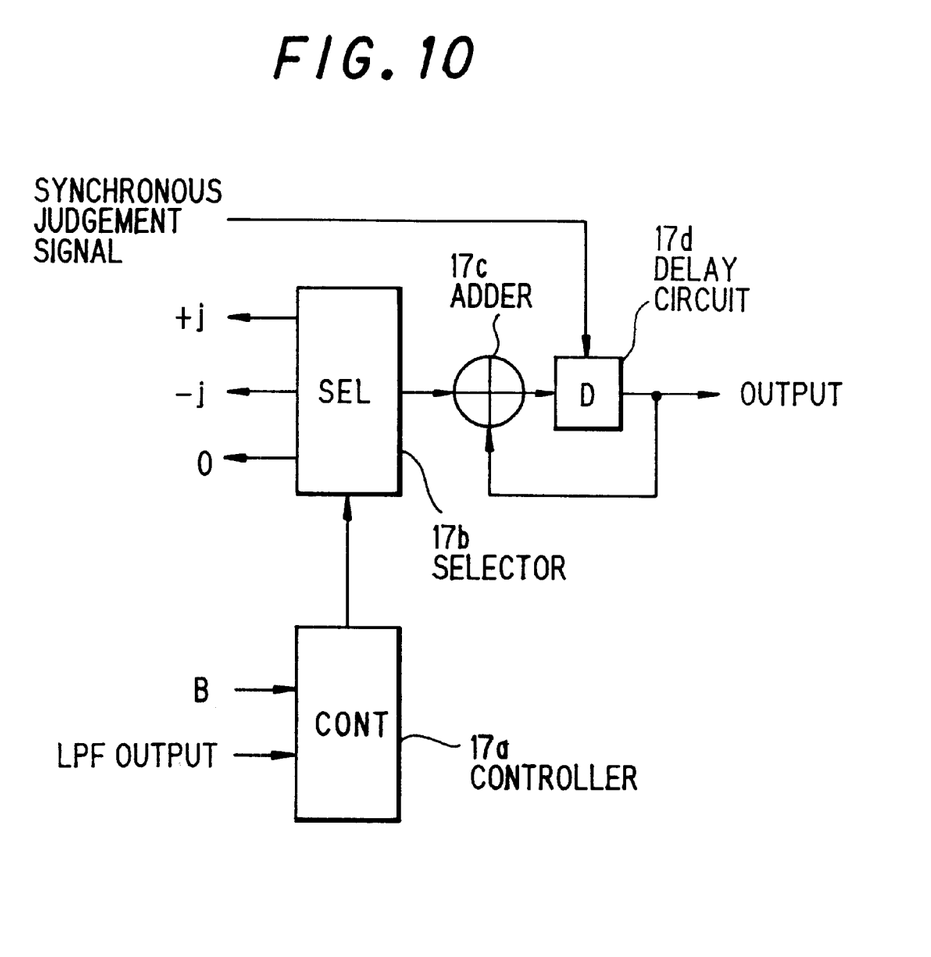
FIG. 10 is a block diagram showing the detailed composition of a replacement circuit (REP) in FIG. 3, and FIGS. 11A and 11B are waveform diagrams showing the operation of the replacement circuit (REP) in FIG. 10 in response to output signal of the loop filter 16 in FIG. 3.

FIG. 10 shows the detailed composition of the replacement, circuit (REP) 17. The replacement circuit 17 comprises a controller (CONT) 17a, a selector (SEL) 17b connected to CONT 17a, and adder 17c connected to SEL 17b, and a delay circuit connected to the adder 17c. CONT 17a compares a threshold value B and an output value of LPF 16, outputting drive signal to SEL 17b. SEL 17b outputs any one of +j, j and 0 according to the drive signal from CONT 17a.

Figure 11A:
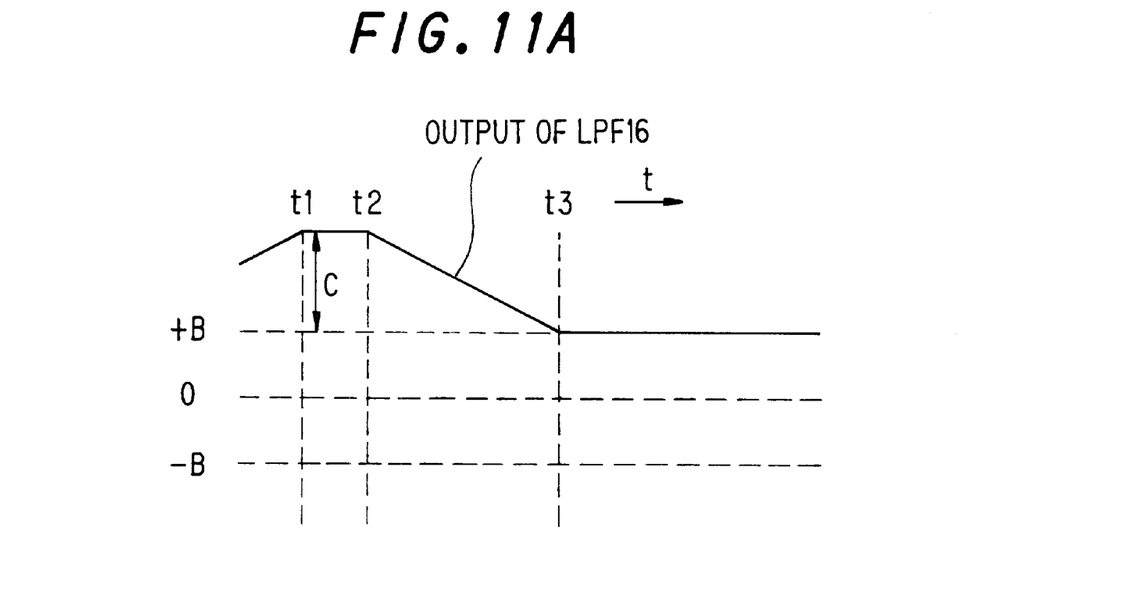
Figure 11B:
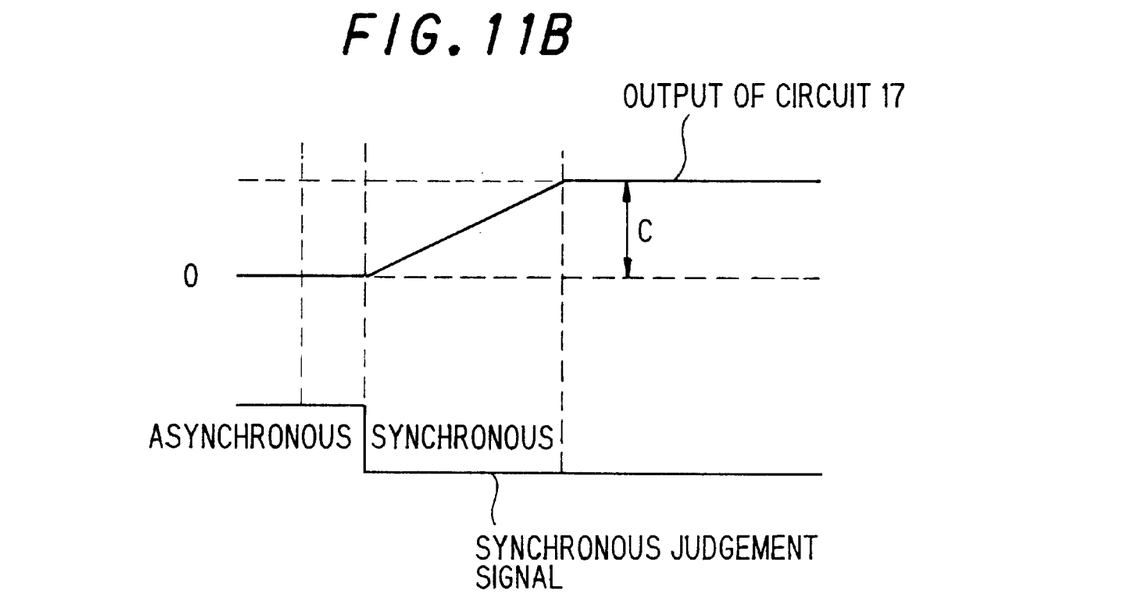

FIGS. 11A and 11B show the operation of the replacement circuit 17 in FIG. 10 according to synchronous judgement signal, output signal waveform of LPF 16 and its output signal. In FIGS. 10 and 11A–11D, when synchronous information (synchronous judgement signal) indicates the asynchronous state (when "H" level signal is output), as shown in FIG. 11B, it operates so that the output of accumulator composed of the adder 17c and the delay circuit 17d is fixed at zero. Output of LPF 16 varies when being in the asynchronous state, for example, the output reaches the center value C at time t1 and deviates from the center at time t2. CONT 17a outputs a judgement value as to whether output value of LPF 16 falls within the threshold range ±B or not and a polarity value of output of LPF 16 to SEL 17b. When the synchronous judgement signal turns into the synchronous state, SEL 17b outputs a value (+j or −j, −j in FIGS. 11D) with a polarity reverse to that of output of LPF 16 to the adder 17c until output of LPF 16 falls within the upper and lower threshold values (35 B). After the absolute value of output of LPF 16 reaches less than the threshold value B at time t3, output to the adder 17c is fixed at zero. Thereby, as shown in FIG. 11B, output of the delay circuit 17d increases and retains value C corresponding to the center value.

Next, the operation of the carrier recovery circuit 10 in FIG. 3 is explained. To EPS 14, the frequency difference between the carrier of input signal of demodulation device and the output of the local oscillator 4 is input. This frequency difference is detected, as a phase error, by PD 15, and then APC (automatic phase control) value corresponding to the frequency is obtained when passing through LPF 16. NCO 31 converts this APC value into phase $\theta$, outputting sin $\theta$ and cons$^\circ$ according to phase $\theta$. In EPS 14, the complex multiplication of output of NCO 21 and input signal is conducted, where one is real part and another is imaginary part. Thereby, input signal of EPS 14 is subject to the rotational symmetry conversion by an angle of $\theta$, and it is controlled so that the phase error in output of EPS 14 comes close to zero. The above is the carrier recovery loop operation in the stationary state.

The pull-in range of carrier is determined by gain of PD 15 and NCO 21 and parameters α, β of LPF 16. Although the pull-in range of carrier is expanded by increasing the loop bandwidth of PLL by the path of EPS 14→PD 15→LPF 16→adder 20→NCO 21, the bit error rate deteriorates since noise in bandwidth increases. Thus, since the pull-in range of carrier cannot be expanded sufficiently only by selection of loop parameter, the pull-in range is expanded using the sweeper 18. The sweeper 18 is basically an oscillator to output triangular wave, and its output waveform is as shown in FIG. 9. The sweeper 18 outputs triangular wave in the asynchronous state of carrier, and, after being synchronized, operates to retain its output. The amplitude of triangular wave determined by threshold value A is determined by a pull-in range required. Also, the frequency of triangular wave is set lower than the loop bandwidth so that the pull-in by LPF 16 is possible. Given that the minimum unit of amplitude variation in triangular wave is k, the cycle T of triangular wave is represented by:

$$T = 4A/k$$

where A is control signal level in FIG. 8.

When APC value that output of the sweeper 10 and output of LPF 16 are added by the adder 20 comes close to the input signal frequency of carrier recovery circuit 10 and falls within the pull-in range of LPF 16, the carrier synchronization is established. By selecting the output frequency of the sweeper 18 properly, the pull in range of carrier can be expanded without increasing the bandwidth of LPF 16.

In order to retain output of the sweeper 18 at the time when the synchronization is established, output value of the sweeper 18 after synchronizing is close to a value corresponding to the carrier frequency, and output value of LPF 16 is close to a value corresponding to the limit of pull-in range of LPF 16. Under these conditions, output value of LPF 16 must be apart from the center value. So, according to a procedure described below, the output value of LPF 16 is transferred to the replacement circuit 17, where the output value of LPF 16 is set back near to the center value. Now, it is given that the carrier synchronization is established at time t1 in FIG. 11A and determination of synchronization is issued at time t2. When the synchronization is, as shown in FIG. 11A, established at positive output value of LPF 16, the replacement circuit 17 continues accumulating +j from time t2. APC value input to NCO 21 is obtained by adding outputs of LPF 16, the sweeper 18 and the replacement circuit 17 at the adder 20, therefore when input frequency of the carrier recovery circuit 10 is constant, APC value corresponding to this frequency is also constant. Accordingly, when output value of the replacement circuit 17 increases, output value of LPF 16 reduces since output value of the sweeper 18 remains unchanged. By stopping the operation of the accumulator in the replacement circuit 17 when detecting that output value of LPF 16 is less than the threshold value +B, the output value of LPF 16 becomes constant and the output value of the replacement circuit 17 becomes constant at a value corresponding to the decrement of output value of LPF 16. Namely, at the time when the synchronization is established, a value C obtained by subtracting the threshold value +B from the original value of LPF 16 is transferred from LPF 16 to the replacement circuit 17. On the contrary, when synchronized at negative frequency, by accumulating −j at the replacement circuit 17, output value of LPF 16 comes close to zero to synchronize.

Here, when the output variation of the replacement circuit 17 is sufficiently later than the follow-up speed of LPF 16, no adverse effect to the retention of synchronization occurs. Also, in the asynchronous state, output of the replacement circuit 17 is fixed at zero, therefore the PLL operation is not affected and the pull-in characteristic is not affected. Further, since in the last result the outputs of the sweeper 18 and the replacement circuit 17 become fixed values (output of the sweeper 18 is 0 and output of the replacement circuit is C), these circuits does not affect the synchronous characteristic. In the stationary state, the synchronous characteristic is determined by only the characteristic of LPF 16.

In the above embodiment, the sweeper 18 and the replacement circuit 17 have an output waveform (triangular wave) constant with time. However, another output waveform such as sine wave that the change rate varies with time can be used. Also, like the sweeper 60 in FIG. 2, saw-tooth wave that can be generated with the simple composition can be used.

Although in the above embodiment the quadrature modulation type demodulation device is explained, this invention is not limited to this modulation type and can apply to various demodulation types such as two-phase PSK (BPSK), tour-phase PSK (QPSK), eight-phase PSK etc.

Further, although in the carrier recovery circuit 10 in FIG. 3 output of LPF 16 is added at the adder 20 after adding output of the replacement circuit 17 to output of the sweeper 18 at the adder 19, this order of addition may be reversed.

Advantages of the Invention:

In the demodulation device with carrier recovery circuit of the invention, since the processing circuit that conducts the processing to bring the value of loop filter near to the center value after the carrier synchronization is established is provided, the loop filter operates near the center of the operable range. Therefore, even when the carrier frequency of input signal to the demodulation device deviates in the positive or negative direction, the loop filter (LPF) can follow up that deviation evenly, thereby the carrier synchronous characteristic can be enhanced. As a result, even when a synthesizer system with large phase noise is used as a local oscillator, deterioration in carrier synchronous characteristic can be suppressed. Therefore, the manufacturing cost can be reduced as well as making the RF frequency variable.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A demodulation device, comprising:
    a demodulating means that conducts the primary demodulation of received modulation wave; and
    a carrier recovery circuit that regenerates a carrier from demodulation signal by said demodulating means and conducts the secondary demodulation of baseband signal using the carrier;
    wherein said carrier recovery circuit comprises:
        a complex operation part that conducts the phase correction of the primary demodulation signal by said demodulating means;
        a phase error detection circuit that detects the phase difference of output signal of said complex operation part;
        a loop filter that suppresses noise component of output signal of said phase error detection circuit;
        a sweeper that generates a predetermined sweep waveform according to carrier synchronous information;
        a processing circuit that conducts a processing to bring a value of said loop filter near to its center value after the carrier synchronization is established;
        an adding means that calculates a value of automatic phase control (APC) by adding three signals of output signal of said loop filter, output signal of said sweep and output signal of said processing circuit; and
        a controlled oscillator that outputs a signal to bring the error component of phase and frequency output from said complex operation part phase near to zero to said complex operation part according to output signal of said adding means.

2. A demodulation device, according to claim 1, wherein:
    said processing circuit, after carrier synchronous information changes from asynchronous into synchronous, conducts the accumulative addition of output signal of said loop filter in the direction opposite to the direction to which output signal of said loop filter changes, and, after the value of output signal of said loop filter falls within a given range, retains that output value.

3. A demodulation device, according to claim 1, wherein said processing circuit comprises:
    a controller that generates drive signal according to the comparison result between a threshold value and an output value of said loop filter;
    a selector that outputs a signal to instruct an increment or decrement or a signal to retain output of zero according to the drive signal from said controller;
    an adder to which output of said selector is input as one addition input; and
    a delay circuit whose output signal is input to said adder as another addition input.

* * * * *